Patented Aug. 7, 1951

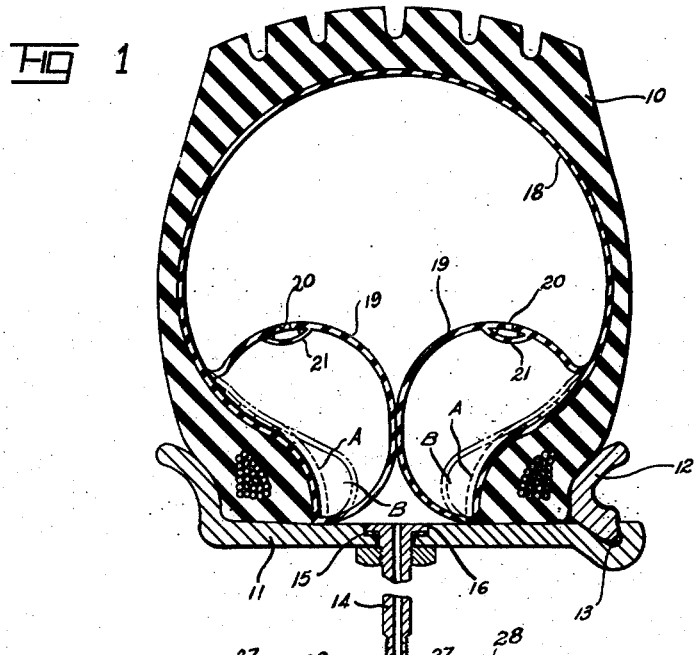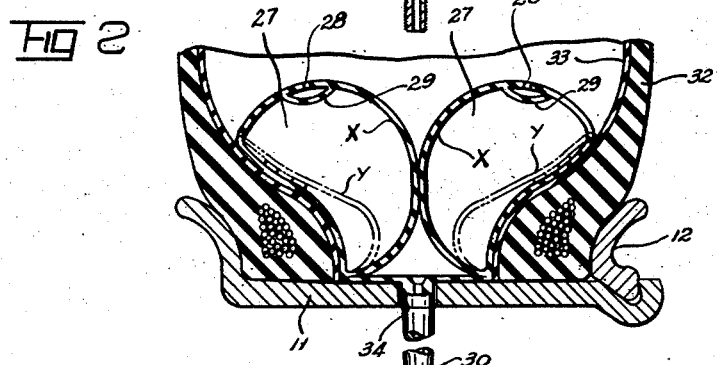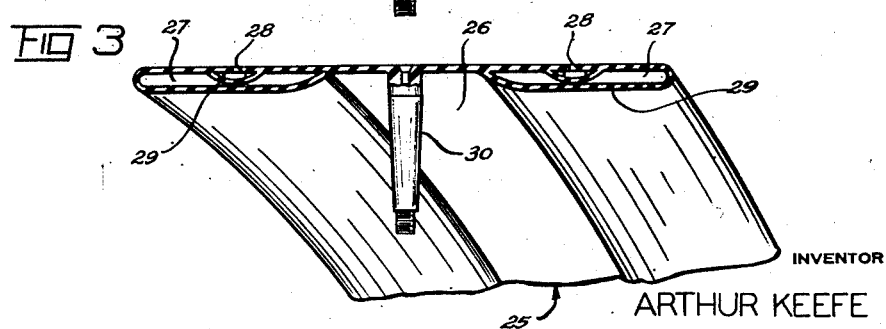

2,563,788

UNITED STATES PATENT OFFICE 2,563,788

TUBELESS PNEUMATIC TIRE

Arthur Keefe, Akron, Ohio, assignor of twenty-four and one-half per cent to Robert B. Romweber and twenty-four and one-half per cent to Richard J. Romweber, both of Akron, Ohio Application August 7, 1947, Serial No. 767,173

5 Claims. (Cl. 152—330)

1

This invention relates to pneumatic tires wherein the conventional inner tube is dispensed with, which tires sometimes are known as "single tube" tires.

Tires of the character mentioned long have been used on bicycles and other manually powered vehicles, but they have not been adopted for use on motor driven vehicles because of problems which heretofore have defied solution. One such problem is the difficulty of preventing the escape of air from the tire, especially where the tire is mounted upon a flat-base rim. In such cases the air may escape around the valve stem that extends through the rim, or it may escape past the bead portions of the tire that engage the tire rim, especially when the tire is subjected to rough service such as would displace said bead portions of the tire from the bead seats of the tire rim. It is to the relief of this condition that this invention primarily is directed.

The chief objects of the invention are to provide tubeless pneumatic tires; to provide in an improved manner for preventing the escape of air from a tubeless tire at the bead seats and at the valve stem of a flat-base rim on which the tire is mounted; and to isolate the air under pressure that supports the tire load from contact with the juncture of the tire beads and the rim on which the tire is mounted. More specifically the invention aims to provide means within the tire forming an air-tight seal between the beads of the tire and the tire rim to enable air to be retained in the tire under pressure without recourse to the conventional inner tube; and to obviate the initial cost and the subsequent cost of pneumatic tire inner tubes. Other objects will be manifest as the description proceeds.

Of the accompanying drawing:

Fig. 1 is a transverse section of a tubeless pneumatic tire embodying the invention, and a tire rim upon which the tire is mounted;

Fig. 2 is a similar section of another embodiment of the invention whereof the bead-sealing means is not an integral part of the tire; and Fig. 3 is a fragmentary perspective view of the bead-sealing means of Fig. 2 as it appears when removed from the tire.

Referring now to Fig. 1 of the drawing, there is shown a pneumatic tire 10 that is mounted upon a flanged tire rim 11 of the well known endless type, also having a removable flange 12 seated in a gutter 13 at one side thereof. A metal valve stem 14 is mounted in a recess in the periphery of the rim 11, a rubber gasket 15 being located in the bottom of the recess under

2 the base flange 16 of the valve stem to prevent the escape of air at this point. The said base flange 16 of the valve stem is flush with the periphery of the tire rim 11 to enable the bead portion of the tire 10 readily to slide thereover during the mounting of the tire.

The tire 10 in most respects is of conventional construction, and differs from conventional construction in that it has an impervious lining of rubber or rubber-like composition 18 on its inner surface, said lining being much thinner than the thickness of a conventional inner tube. Formed interiorly of the tire, at the inner circumference thereof, are circumferentially arranged, distensible chambers or pockets 19, 19, that are disposed on opposite sides of the opening at the inner circumference of the tire. The margins of each pocket 19 are united to the lining 18 at the toe of a bead of the tire and at a region substantially medially of the side wall of the tire above said bead. The pockets 19 are inflatable through respective relatively small openings or ports 20 that are formed therein, which ports are backed by respective flutter valves 21 that prevent the escape of air from the pockets. When uninflated, the pockets or chambers 19 are substantially flush against the inner surface of the tire 10, as indicated by the broken line position A in Fig. 1. When initially inflated, the chambers 19 are distended substantially to the position shown in full lines in Fig. 1. It will be understood that only light pressure is required to inflate the chambers to the full-line position shown.

In operation, the pockets or chambers 19 are inflated before the tire 10 is mounted on the rim 11. Then when the tire is mounted upon the rim, the distended walls of the pockets are in contact with each other throughout a circumferential area of appreciable width radially of the tire. Inflation of the tire is then effected through the agency of the valve stem 14. Air from the latter is under much greater pressure than the air in the chambers 19 with the result that the incoming air is able to force its way past the abutting walls of said chambers and thereby to enter the interior of the tire and inflate the same. As the result of the inflation of the tire, some of the high pressure air may enter the chambers 19 through the ports 20 and past the flutter valves 21, but before equilibrium of pressure is established between the interior and exterior of the chambers, the walls of the latter are forced toward the inner surface of the tire and the flutter valves 21 closed by engagement with the inner surface of the tire, as shown by the intermediate broken line position of the chambers in Fig. 1. Thus, air will be trapped in the chambers 19, with the result that a bulge or blister is formed at the toe of each bead, as indicated at B, Fig. 1, which bulge bears against the adjacent surface of the rim 11 and effectively prevents air from leaking out of the tire between the tire beads and the bead seats of the tire rim.

From the foregoing it will be apparent that the invention provides in an efficient and simple manner for utilizing the inflation pressure of a pneumatic tire to prevent the escape of air from the tire at the beads thereof, and that the other advantages set out in the foregoing statement of objects are achieved.

The embodiment of the invention shown in Figs. 2 and 3 differs from that previously described in that the inflatable chambers or pockets are comprised in a structure that is free and independent of the tire. Said structure, which is designated as a whole by the numeral 25 is composed of elastic rubber or rubber-like composition, and is of annular or endless form. The structure consists of a central, circumferential region 26 of a single ply of material, and circumferentially extending chambers or pockets 27, 27, integral with the respective lateral margins of said region 26. Each chamber 27 has a single opening or port 28 through which it may be inflated, there being a flutter valve 29 backing each of said ports, interiorly of a chamber, to prevent the escape of air therefrom. The width of region 26 is substantially the same as the distance between the toes of the tire beads of the tire with which the structure is designed for use. A valve stem 30, herein shown as a conventional rubber valve stem, is united with said central region 26 and arranged to discharge air therethrough on the same side of the structure as the ports 28.

In operation, the chambers 27 of structure 25 are lightly inflated with air admitted thereto through ports 28, whereby said chambers are rounded out and slightly distended. The structure 25 is then inserted into a pneumatic tire casing 32, Fig. 2, which may be of conventional construction, but preferably has an impervious lining of rubber or rubber-like composition 33 on its inner surface. The assembled structure is then mounted upon a conventional tire rim 11, with the valve stem 30 extending through the usual valve-opening 34 in the rim. As the tire beads are moved into place and the removable flange 12 of the tire rim replaced, the inflated chambers 27 of the structure 25 will be brought into juxtaposition as indicated in full lines X, Fig. 2. Air is then admitted to the tire, as in the previously described embodiment of the invention, through the agency of the valve stem 30, said air forcing its way past the abutting surfaces of the chambers 27 and inflating the tire to the pressure desired. Some of the inflowing air may pass through the ports 28 and into the chambers 27, but due to the small size of said ports such inflow is too slow to effect an equilibrium of pressures interiorly and exteriorly of the chambers, with the result that the walls of the latter collapse to the position shown at Y, Fig. 2, the flutter valves thereby closing off the ports 28. Thus air remaining in the chambers 27 is trapped therein, and the chambers are forced tightly against the inner surface of opposite sides of the tire by the inflation pressure within the tire. This prevents loss of inflation pressure by leakage of air between the bead portions of the tire and the bead-seats of the tire rim.

It will be understood that a specific tire rim is shown herein for illustrative purposes only, and that any other tire rim of suitable or preferred construction may be employed if desired.

Other modification may be resorted to without departing from the spirit of the invention or the scope thereof as defined by the appended claims.

What is claimed is:

1. A tubeless pneumatic tire comprising inflatable elastic chambers located interiorly of the tire contiguous with the toes of the respective tire beads, a port in the wall of each chamber through which said chambers are inflated to a pressure lower than the pressure to which the tire is inflated, and a flutter valve operatively associated with each port which allows air to enter said chambers but prevents the escape of air from said chambers, said port and flutter valve being located adjacent the portion of the wall of each of said chambers opposite the contiguity with said toes, whereby the greater pressure within the tire will cause the said portions of the walls of the chambers to collapse against the inner side walls of the tire thereby closing the flutter valves and enabling said chambers to prevent the escape of air from the tire at the beads thereof.

2. A combination as defined in claim 1 whereof the air chambers are an integral part of the tire.

3. A combination as defined in claim 1 whereof the air chambers are separable from the tire, including a band-like member adapted to lie between the toes of the tire beads and connect the chambers to each other.

4. A combination as defined in claim 1 including a rim on which said tire is mounted, a valved inflation stem mounted in the tire rim, and means constituting an air-tight seal for the stem in the rim.

5. A combination as defined in claim 1 whereof the air chambers are separable from the tire, including a band-like member adapted to lie between the toes of the tire beads and connect the chambers to each other, and a valved inflation stem mounted in said band-like member.

ARTHUR KEEFE.

REFERENCES CITED

The following references are of record in the file of this patent:

UNITED STATES PATENTS

| Number | Name | Date |
| --- | --- | --- |
| 2,308,955 | Wilson et al. | Jan. 19, 1943 |
| 2,331,795 | McMahan | Oct. 12, 1943 |
| 2,404,578 | Liska | July 23, 1946 |

FOREIGN PATENTS

| Number | Country | Date |
| --- | --- | --- |
| 24 | Great Britain | 1897 |
| 4,075 | Great Britain | 1897 |